June 19, 1951     R. T. HOLLAND     2,557,872

EMERGENCY FENDER LIGHT

Filed April 20, 1948

R. T. Holland

INVENTOR

BY CA Snow & Co.

ATTORNEYS.

Patented June 19, 1951

2,557,872

UNITED STATES PATENT OFFICE 2,557,872

EMERGENCY FENDER LIGHT

Raymond T. Holland, Macon, Mo.

Application April 20, 1948, Serial No. 22,147

1 Claim. (Cl. 240—8.1)

This invention relates to improvements in emergency fender lights.

An object of the invention is to provide an improved emergency fender light.

Another object of the invention is to provide an improved emergency light for positioning in the sides of each of the four fenders of a vehicle, whereby any one of said emergency lights may be illuminated and swung outwardly and downwardly to shine a light over the vehicle wheel so that in case of a puncture or other tire trouble at night, sufficient light will be provided to see while making the repair.

A further object of the invention is to provide pivotally mounted emergency lights in the four fenders of a vehicle, with locking means for automatically holding the light in the desired position when pivoted outwardly from the fender.

A still further object of the invention is to provide an improved emergency fender light for vehicles which will be highly efficient in operation, and relatively inexpensive to manufacture and produce.

Other objects will appear as the description proceeds.

In the accompanying drawings which form a part of this application,

Like characters of reference are used throughout the following specification and the accompanying drawings to designate corresponding parts.

Figure 1:
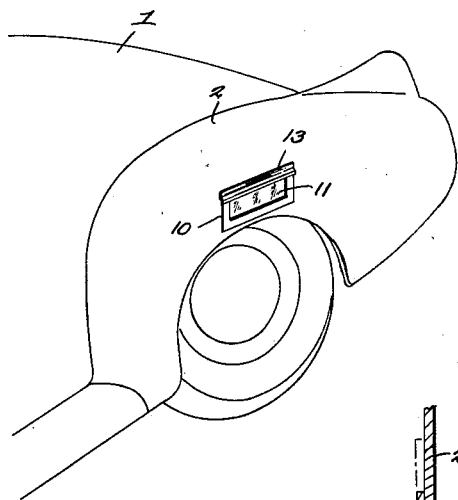
Figure 1 is a perspective view of the rear left portion of an automobile showing its fender equipped with an emergency fender light.
Figure 2:
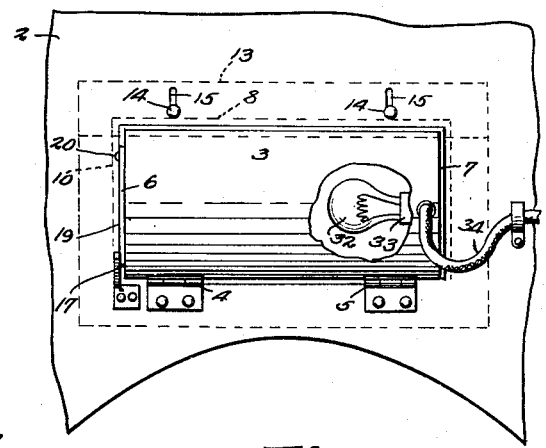
Fig. 2 is a rear elevation of the improved emergency fender light in a fender, with part of the light being broken away to show the light bulb therein.
Figure 3:
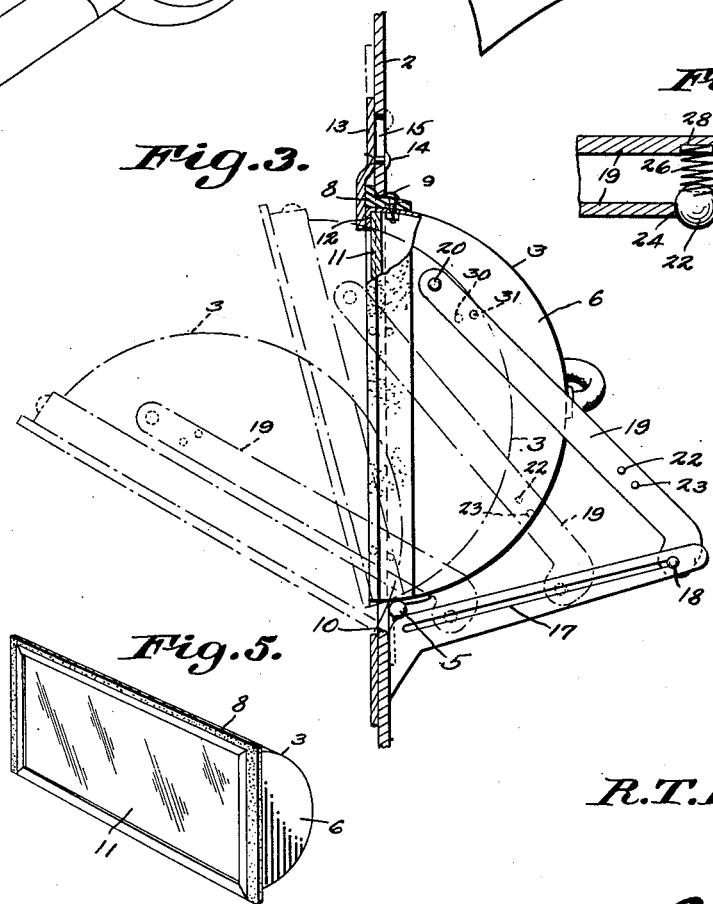
Fig. 3 is an end view of the emergency fender light showing a part thereof being broken away to show its lens, and the vehicle fender which supports it being shown in sectional elevation.
Figure 4:
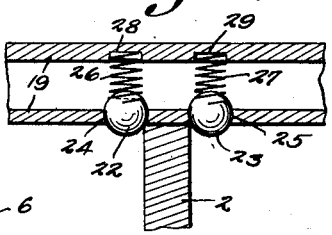
Fig. 4 is an enlarged detail sectional view showing the spring ball locking means for the light.
Figure 5:
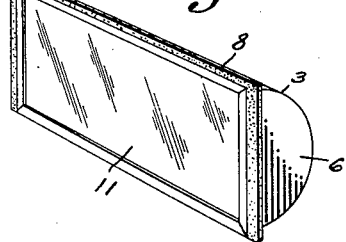
Fig. 5 is a perspective view of the light.

In carrying out the invention a vehicle 1 is provided with fenders 2, only the left rear fender being shown in Fig. 1 of the drawings for purposes of illustration, it being understood that it is intended that the improved emergency fender light be incorporated in each of the four vehicle fenders 2.

The light comprises an arcuate elongated combination body and reflector 3 hinged at the bottom edge by the hinges 4 and 5, and having opposite ends 6 and 7.

A rubber gasket 8 is secured across the top and ends of the body 3 by means of the small bolts 9. The gasket is L-shaped in cross section for forming a waterproof joint with the edges of the rectangular openings 10 cut in the fenders 2.

A glass plate or lens 11 is provided for the front of the body 3 and is supported by an inwardly directed flange 12.

A vertically reciprocable transversely extending offset latch plate 13 is disposed above the body 2 and is operable by means of the rivets 14 secured to the plate 13 being slidable in the vertical slots 15 in the fender 2.

A longitudinally and inwardly extending slotted bracket 17 is secured to the inner surface of the fender 2 and a headed rivet 18 on the free end of the parallel interconnected brace arms 19 is slidable therein. The opposite ends of the arms 19 are pivoted on the rivet 20 to one end 6 of the body 2. Spaced ball bearing latches 22 and 23 extend partially through openings 24 and 25 in one of the arms 19 and are tensioned by the coil springs 26 and 27 supported in the seats 28 and 29 in the other arm 19, whereby when the lamp body is pivoted outwardly, the edge of the fender 2 will be disposed and latched between the ball bearing latches 22 and 23.

Similar latches 30 and 31 are supported by the arms 19 adjacent their inner ends for holding the lamp body in partly open position.

A lamp 32 and socket 33 will be disposed in the body 2 and will be connected by the conductor 34 to the vehicle battery (not shown) and controlled by a switch (not shown) on the vehicle dash or instrument board.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention, what I claim as new and desire to secure by Letters Patent of the United States is:

An emergency fender light construction including a vehicle fender having an opening formed therethrough, a light casing hinged in said opening for vertical swinging movement outwardly from the fender, a light bulb in said casing, a bracket extending inwardly from the rear surface of the fender adjacent to the opening, said bracket being inclined upwardly from said fender, said bracket having a slot disposed longitudinally thereof, a brace arm pivotally secured to the casing, said brace arm having a laterally extended end disposed adjacent to said bracket, a headed rivet extending from the laterally extended end of the brace arm disposed in the slot, securing the casing in various angular positions with respect to the side of the fender, pairs of ball bearing latches extending from the side of the brace arm adapted to grip the fender holding the light casing in a fixed position with respect to the fender, a latch plate engageable with the edge of the casing, and said latch plate holding the casing within the opening.

RAYMOND T. HOLLAND.

REFERENCES CITED

The following references are of record in the file of this patent:

UNITED STATES PATENTS

| Number | Name | Date |
|---|---|---|
| 1,338,571 | Kelly | Apr. 27, 1920 |
| 1,543,159 | Hopkins et al. | June 23, 1925 |
| 1,696,521 | Capell | Dec. 25, 1928 |
| 1,761,345 | Isackson | June 3, 1930 |
| 1,796,551 | Wismer | Mar. 17, 1931 |
| 2,264,109 | Bridge | Nov. 25, 1941 |
| 2,270,914 | Williams | Jan. 27, 1942 |
| 2,334,484 | Dunbar | Nov. 16, 1943 |
| 2,338,541 | Roedding | Jan. 4, 1944 |

FOREIGN PATENTS

| Number | Country | Date |
|---|---|---|
| 485,484 | England | Dec. 6, 1937 |